Dec. 5, 1967 J. W. SEDLMEYER 3,356,961
VOLTAGE STRETCH CIRCUIT
Filed Oct. 9, 1964
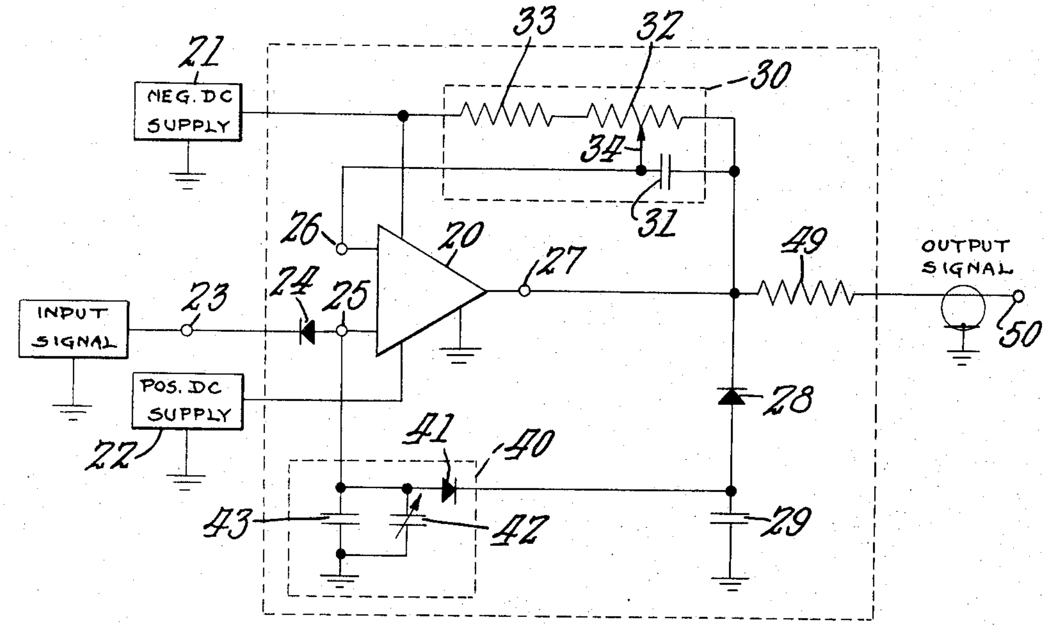
Inventor
Joseph W. Sedlmeyer
By Cadwallader, Kelly & Dacey
Attorneys

United States Patent Office 3,356,961
Patented Dec. 5, 1967

3,356,961
VOLTAGE STRETCH CIRCUIT

Joseph W. Sedlmeyer, Las Vegas, Nev., assignor, by mesne assignments, to the United States of America as represented by the United States Atomic Energy Commission

Filed Oct. 9, 1964, Ser. No. 402,969
1 Claim. (Cl. 330—69)

This application is a continuation-in-part of application Serial No. 191,865 filed May 2, 1962, now abandoned. The present invention relates to voltage stretch circuits and in particular to voltage stretch circuits in which a difference amplifier is utilized. The invention described herein was made in the course of Contract AT(29–1)–1183 with the U.S. Atomic Energy Commission.

Presently known voltage stretch circuits comprise diode-capacitive networks, or such networks combined with amplifier and cathode-follower electronic circuits. These circuits have certain disadvantages. Many of them cannot respond to pulses having a time duration of 5 to 10 nanoseconds. In others the stretch times are too short and the voltage to be maintained drops off in amplitude at too great a rate.

Accordingly, it is an object of the present invention to provide a stretch circuit having a stretch time on the order of several seconds or greater.

A further object is to provide a stretch circuit wherein the droop over the stretched time is one percent or less.

Still a further object is to provide a stretch circuit that will respond to pulses having time durations of at least 5 to 10 nanoseconds.

To summarize, the foregoing objects are achieved by utilizing both regenerative and degenerative feedback in a circuit with a difference amplifier. With such a system, stretch factors of $10^8$ have been achieved with less than one percent droop.

Other and further objects and advantages of the invention will become apparent upon careful perusal of the description and appended claim together with the accompanying drawing which illustrates a schematic diagram of a preferred embodiment of the voltage stretch circuit of the present invention.

Suppose one has two signals $e_1$ and $e_2$, each measured with respect to a specific reference level. A difference amplifier will be defined herein as one that generates a third signal, also referred to the same reference level, which signal is proportional to the voltage difference $e_1-e_2$.

The stretch circuit of the present invention illustrated in the drawing comprises difference amplifier 20, degenerative feedback loop 30, regenerative feedback loop 40 and several other components which will be described presently. Negative DC supply 21 furnishes negative DC potential to difference amplifier 20 and to degenerative feedback loop 30, as illustrated. Positive DC supply 22 furnishes positive DC potential to difference amplifier 20, as illustrated. The input signal is applied at terminal 23, through diode 24 to terminal 25 of difference amplifier 20. The degenerative signal, if any, is applied from degenerative feedback loop 30 to difference amplifier 20 at terminal 26. The output of difference amplifier 20 appears at terminal 27 and is applied through diode 28 to stretch capacitor 29, and to degenerative feedback loop 30, both as illustrated. The output signal of the stretch circuit of the present invention appears at terminal 50.

Difference amplifier 20 must have a high input impedance and a low output impedance. Typical difference amplifiers 20 have an open loop gain of 10,000 and an input impedance above 100 megohms.

A typical circuit for degenerative feedback loop 30 is illustrated as comprising capacitor 31, potentiometer 32 and resistor 33, connected as illustrated. The negative DC potential from negative DC supply 21 is divided across resistor 33, potentiometer 32 and the output resistance of difference amplifier 20. When the input signal at terminal 23 is zero volts, wiper 34 of potentiometer 32 is adjusted to produce an output signal of zero volts on terminal 50. This in effect balances out any residual unbalance in difference amplifier 20, provides stability and reduces overall circuit gain to unit.

The regenerative feedback loop comprises diode 41 and capacitors 42 and 43. As used herein, capacitor 43 is intended to represent the sum of the stray capacitance and the input capacitance of difference amplifier 20. Capacitor 42 is a trimmer capacitance. Capacitors 42 and 43 are hereinafter called the circuit input capacitance and may have a total value of 20 picofarads, more or less.

The combination of the circuit input capacitance and the high input resistance connected from terminal 25 through difference amplifier 20 to ground is a resistance-capacitance network having a long RC time constant which pre-stretches pulses so short in time duration that difference amplifier 20 otherwise would not respond to them. In operation a negative signal pulse, such as one having a time duration from 5 to 10 nanoseconds, may be applied to terminal 23. During the time that it is being pre-stretched, as discussed above, diode 24 isolates the signal source from the stretch circuit.

Difference amplifier 20 reproduces this signal pulse as a negative output signal at terminal 27. This negative output signal forward biases diode 28 and charges stretch capacitor 29 fairly rapidly because of the low output impedance of difference amplifier 20. Note the polarity of diode 28.

When capacitors 42 and 43 begin to discharge through the input impedance of difference amplifier 20, diode 41 becomes forward biased and charge is transferred from stretch capacitor 29 to capacitors 42 and 43 to maintain the amplitude of the input signal voltage constant. The voltage on capacitor 29 is also applied through degenerative feedback loop 30 to terminal 26 of difference amplifier 20. Difference amplifier 20 sees the voltage difference between the voltages at terminals 25 and 26, which voltage difference is multiplied by the open loop gain of difference amplifier 20 to recharge stretch capacitor 29 to its original value.

This process continues, keeping the signal input voltage essentially constant at its peak value and thereby maintaining a constant voltage on capacitor 29. This voltage is applied through diode 28 and limiting resistor 49 to terminal 50 as the output voltage. Limiting resistor 49 prevents excess loading of the circuit by the external load circuitry. Signal voltage amplitudes have been held constant timewise by factors of $10^8$. Diodes 28 and 29 were FD–100's presently manufactured and sold by the Fairchild Semiconductor Corporation of 545 Whisman Road, Mountain View, California.

While a specific embodiment has been disclosed, other modifications will occur to those skilled in the art. For example, it will be understood by those skilled in the art that polarities may be reversed to stretch positive signal pulses. All such are considered to lie within the true spirit and scope of the invention as hereinafter defined in the appended claim.

I claim:

A circuit for stretching in time and amplitude of a signal pulse of short time duration, said circuit comprising:

a difference amplifier with first and second input terminals and an output terminal, said difference amplifier being designed to amplify the difference in voltages applied to said first and second input terminals;

circuit input impedance comprising circuit input capacitance connected between said first terminal and ground and a high resistance connected from said first terminal through said difference amplifier to ground, having a long RC time constant, for prestretching in time the amplitude of said signal pulse of short time duration when it is applied between said first input terminal and ground;

a stretch capacitor and a diode connected in series between said output terminal and ground, said diode having one terminal connected to said output terminal of said difference amplifier and said stretch capacitor having one plate connected to ground, said diode being so poled that when said signal pulse is first applied to said first terminal of said difference amplifier and no voltage is applied to the second terminal thereof, said difference amplifier amplifies said voltage and charges said stretch capacitor to a voltage having an amplitude at least equal to the voltage amplitude of said signal pulse;

a generative feedback circuit connected between said stretch capacitor and said input circuit capacitance and adapted to charge said circuit input capacitance from said stretch capacitor when said input capacitance commences to discharge through said input resistance to ground, thereby maintaining said signal pulse on said first terminal of said difference amplifier substantially constant; and a degenerative feedback circuit connected between said output terminal and said second terminal of said difference amplifier, adapted to apply the voltage on said output terminal to said second terminal, and having circuit means to improve the stability of said difference amplifier and limit the gain of said difference amplifier to unity, whereupon said difference amplifier amplifies the difference in voltages on its first and second input terminals producing an output sufficient to maintain the voltage amplitude on said stretch capacitor substantially equal to the voltage amplitude of said signal pulse.

References Cited

UNITED STATES PATENTS

| | | | |
|---|---|---|---|
| 2,367,110 | 1/1945 | Fayers | 330—104 |
| 2,977,547 | 3/1961 | Talambiras | 330—69 |

ROY LAKE, *Primary Examiner.*

NATHAN KAUFMAN, *Examiner.*